Oct. 25, 1932. W. NOBLE 1,884,141
METHOD OF BRAZING
Filed June 28, 1930  2 Sheets-Sheet 2
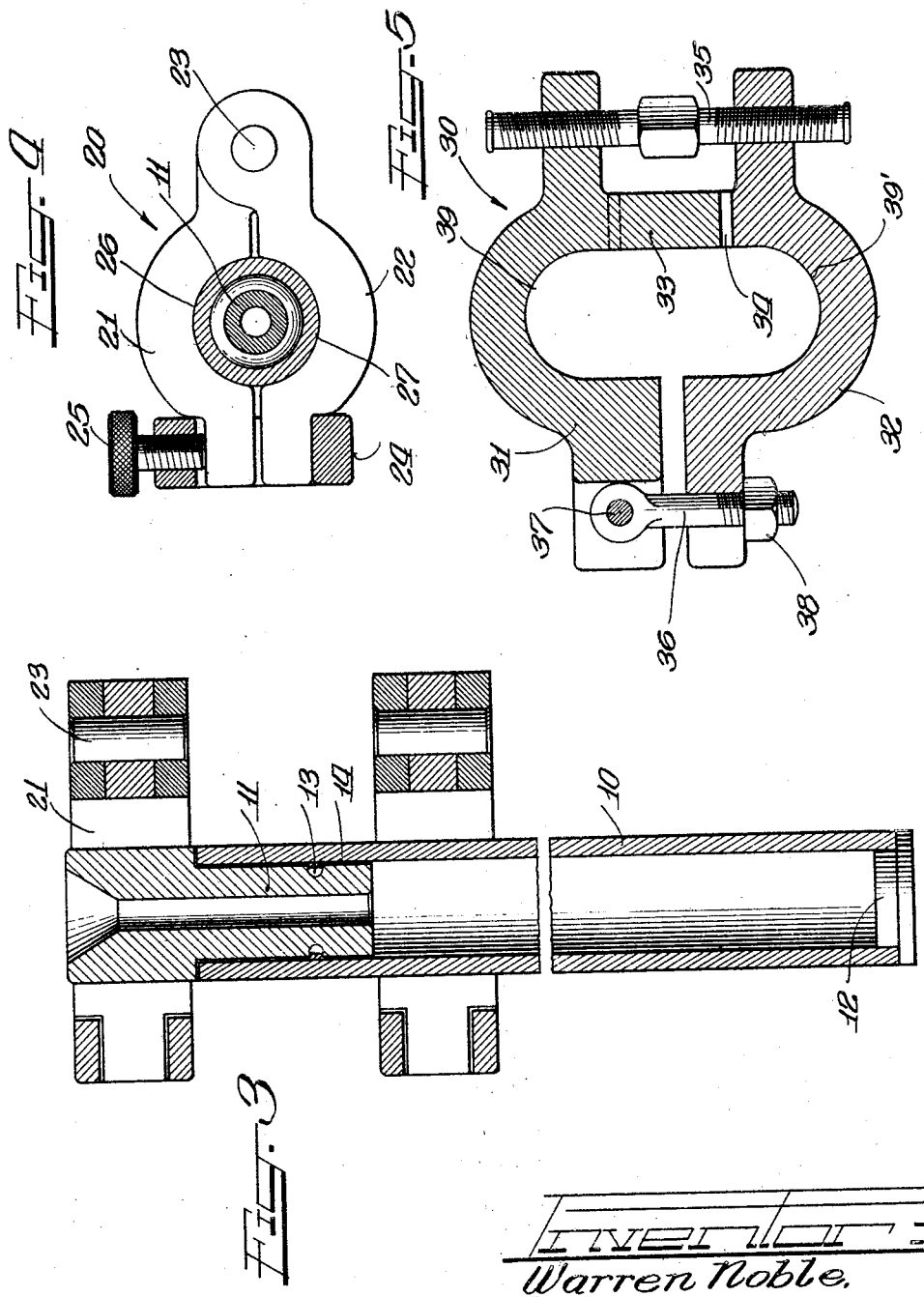

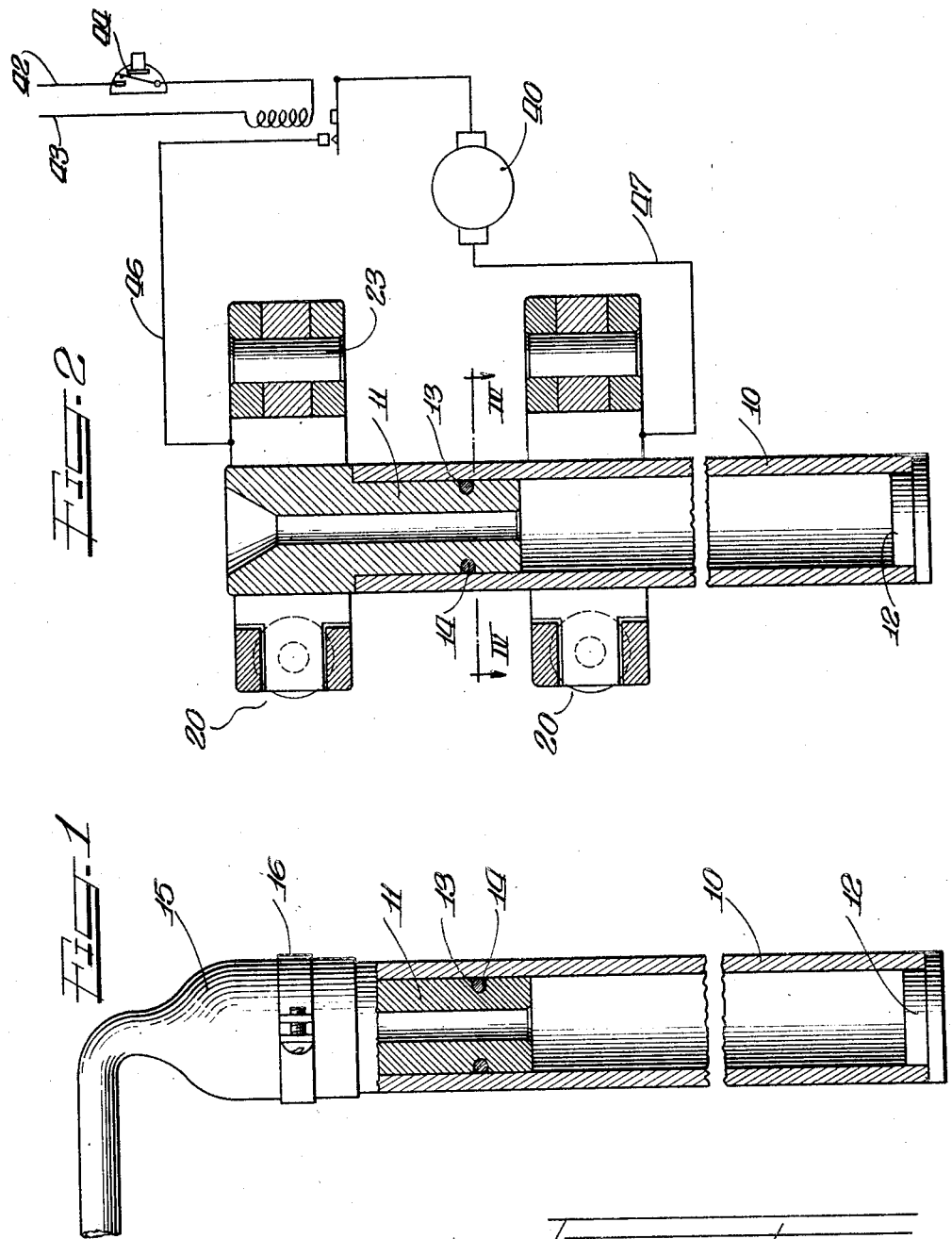

Patented Oct. 25, 1932

1,884,141

UNITED STATES PATENT OFFICE

WARREN NOBLE, OF DETROIT, MICHIGAN, ASSIGNOR TO ELECTROMASTER, INC., OF DETROIT, MICHIGAN, A CORPORATION OF MICHIGAN

METHOD OF BRAZING

Application filed June 28, 1930. Serial No. 464,693.

This invention relates to a method of and apparatus for brazing and more particularly to method of brazing and an apparatus for practicing the same whereby heat is concentrated over a restricted area of the parts being acted on for the purpose of causing metal to flow in a desired path.

Heretofore, it has been the custom to provide a furnace in which certain parts to be brazed are heated and subjected to an atmosphere of hydrogen. The drawbacks to such practice are that much heat is wasted in heating an unnecessarily large area, a very substantial amount of time is consumed in bringing the parts to a required temperature, much care is required for the furnace both in brazing and during operation and also parts so heated very often warp as a result of the heat.

An object of this invention is to provide a method of and apparatus for brazing in which these drawbacks are overcome.

It is another object to provide a brazing apparatus which will function to turn out work evenly, rapidly and neatly so that it may readily lend itself to use in production.

A further object is to provide a method and apparatus of the type described for operation at very reduced costs comparable to previous methods of accomplishing the same ends while at the same time improve over these methods by eliminating the distortion oftentimes resulting therefrom.

More specifically, it is the object of this invention to provide an electrical means for locally heating steel parts to be brazed and to provide a hydrogen atmosphere in such manner that upon a concentrated application of heat the brass or other brazing material will flow quite readily to effectively secure the desired parts together.

In accordance with the general features of this invention there is provided two sets of jaws, each set comprising an electric terminal and each set having a shape to receive the article to be brazed. Hydrogen is stored in a convenient place, as for instance, within the article to be brazed which is inserted into the two sets of jaws. A current is passed through the article causing sufficient heat to melt the brass or other brazing metal which has been previously placed in proper position and the current is intermittently fed therethrough until proper indication is had of the completion of the brass flow, whereupon the article is removed and cooled or otherwise treated as desired.

Other objects and features of my invention will more fully appear from the following detail description taken in connection with the accompanying drawings which illustrate several embodiments thereof, and in which Figure 1 is a sectional view of the articles to be brazed, showing how the hollow one may be filled with hydrogen;

Figure 2 is a sectional view illustrating the articles in my novel brazing apparatus and showing diagrammatically the electrical circuit therefor;

Figure 3 is a sectional view of the articles after they have been brazed;

Figure 4 is a view partly in section of one of the clamps showing it applied to the article to be brazed and is taken substantially on the plane IV—IV of Figure 2 looking in a direction indicated by the arrows; and Figure 5 is a sectional view of a modified form of clamp.

The reference character 10 designates generally an article in the form of a tube which is chosen for the present illustration and to which it is desired to braze a hollow plug 11 therein. It is, of course, to be understood that the invention is not limited in its application to an article of the character illustrated, but may be used with equal advantage with many other types of articles where it is desired to braze one part to another.

The lower end of the tube 10 is plugged by any suitable means such for example, as the cap 12. The tubular plug 11 in the upper end of the tube 10 is provided with an annular groove in its periphery designated by the reference character 13 and in which is disposed a brass ring 14 in contact with both the plug 11 and the inner surface of the tube 10. It is this ring 14 which is to fuse the tube 10 to the plug 11.

The first step of my novel process of brazing is illustrated in Figure 1. This step comprises the exhausting of the air from the tube 10 by means of a suitable hose 15 fastened to the upper end of the tube 10 by the clamps 16. A conventional suction device may be connected to the tube 15 for exhausting the air from the tube 10. Thereafter hydrogen may be passed through the tubing 15 into the bottom of the tube 10. The hydrogen being in the tube 10 once it is placed therein will diffuse relatively slowly into the outside atmosphere and for that reason it will not be necessary to plug up the bore of the element 11. Also it is to be understood that the tube 10 may be filled with gas after it has been mounted in the clamps to be described hereinafter, if it is so desired instead of before its mounting in the clamps, depending upon the particular desires of the attendant.

Suitable clamping mechanism in the form of jaws 20 is provided for engaging the article or tube 10. These jaws are of necessity shaped to correspond with the contour of the article. That is to say, the openings of the jaws may be made of any desirable size, or may be variable as in the case of a monkey-wrench, the main point being that they be of such shape as to closely accommodate the article to be brazed. The jaws 20—20 may be mounted on a table or any other convenient and suitable support (not shown).

Each set of jaws 20 as best shown in Figure 4, comprise oppositely disposed jaw-pieces 21—22 pivotally connected together at 23 and having their free ends formed for engagement by a locking clamp 24 including a set-screw 25. The intermediate portions of these two clamps 21—22 are provided with arcuate recesses 26—27 for receiving the cylindrical article or tube 10 to be brazed.

In Figure 5 I have illustrated a modified form of clamp 30 comprising a pair of spaced jaws 31—31. The jaw 31 has a tongue 33 adapted to fit between a pair of spaced projections 34 formed integral with the jaw 32. At one end each of the jaws 31—32 is threaded on a turn-screw 35 which serves as a means for adjustably securing the jaws together. The other ends of the jaws 31—32 are connected together by means of a bolt 36 having one end pivoted at 37 to the jaw 31 and having its other end provided with a nut 38 for engaging a shoulder on the jaw 32. The intermediate portions of the jaws 31—32 are provided with recesses 39—39' shaped to conform with the contour of the article to be engaged by the clamp.

It is, of course, to be understood that while I have illustrated several forms of clamps which may be used in connection with the present process of my invention, the invention is not to be thus limited for, obviously, there are many other types of clamps which may be used in connection with my invention without deviating from the principles of the invention.

As best shown in Figure 2, one of the clamps 20 is secured to the plug 11 and the other clamp is secured to the tube 10.

The numeral 40 designates a generator supplied by the power lines 42 and 43 and controlled through the medium of a switch 44 which operates a magnetic relay 45. The current from the generator is taken off by the lines 46 and 47 which are connected to the two terminal clamps 20—20.

As previously pointed out either immediately prior to the placing of the article in the jaws or immediately prior to the application of current the air is exhausted from the tube 10 and hydrogen is applied to fill the tube. Current is thereafter intermittently applied by an operator by means of the switch 44 whereupon the article is heated locally and the brass ring or other brazing medium is fused. Obviously, the hydrogen expands under the heating and forms a flux which aids in the brazing operation. Then too, it is to be readily seen that an operator can watch the entire operation and continue to apply the current until the fusion is completed.

In Figure 3 I have illustrated the result of the brazing operation on the brass ring 14 which has now fused the plug 11 to the tube 10. Thereafter the clamps 20 may be removed and applied to another tube which is to be brazed.

Now I desire it understood that although I have illustrated and described in detail the preferred embodiment of my invention, the invention is not to be thus limited but only in so far as defined by the scope and spirit of the appended claims.

I claim:

1. The process of preparing an article for brazing, said article comprising a plurality of parts one of which is hollow, which consists in assembling the parts together with a brazing metal therebetween at the place where the brazing of the parts is to be effected and with a space contiguous the brazing metal in communication with the interior of the hollow part, and confining a reducing gas within the hollow part, said parts, brazing metal and the confined gas forming a unitary assembly adapted to be thereafter presented as a unit for the brazing operation.

2. The process of preparing an article for brazing, said article comprising a plurality of parts one of which is hollow, which consists in assembling the parts together with a brass strip therebetween at the place where the brazing of the parts is to be effected and with the space contiguous the strip in communication with the interior of the hollow part, and confining hydrogen gas within the hollow part, said parts, brass strip and confined gas forming a unitary assembly adapted to be thereafter presented as a unit for the brazing operation.

In testimony whereof I have hereunto subscribed my name at Detroit, Wayne County, Michigan.

WARREN NOBLE.